(12) United States Patent
Kling et al.

(10) Patent No.: US 7,352,141 B2
(45) Date of Patent: Apr. 1, 2008

(54) DEVICE AND METHOD TO MONITOR AN APPARATUS

(75) Inventors: Sören Kling, Västerås (SE); Gunnar Johansson, Skultuna (SE)

(73) Assignee: ABB AB, Västerås (SE)

( * ) Notice: Subject to any disclaimer, the term of this patent is extended or adjusted under 35 U.S.C. 154(b) by 0 days.

(21) Appl. No.: 10/547,289

(22) PCT Filed: Mar. 2, 2004

(86) PCT No.: PCT/SE2004/000291

§ 371 (c)(1),
(2), (4) Date: May 25, 2006

(87) PCT Pub. No.: WO2004/079889

PCT Pub. Date: Sep. 16, 2004

(65) Prior Publication Data

US 2006/0208673 A1    Sep. 21, 2006

Related U.S. Application Data

(60) Provisional application No. 60/450,679, filed on Mar. 3, 2003.

(51) Int. Cl.
*H02P 5/00*     (2006.01)
*H02P 5/46*     (2006.01)
*H02P 7/08*     (2006.01)

(52) U.S. Cl. .......................... 318/66; 318/110; 318/111; 318/112; 318/113

(58) Field of Classification Search .................. 318/59, 318/66, 111–113, 700–800
See application file for complete search history.

(56) References Cited

U.S. PATENT DOCUMENTS

| | | | |
|---|---|---|---|
| 5,610,819 A * | 3/1997 | Mann et al. | 701/20 |
| 5,659,480 A * | 8/1997 | Anderson et al. | 700/186 |
| 5,714,852 A * | 2/1998 | Enderich | 318/256 |
| 5,767,635 A * | 6/1998 | Steffens et al. | 318/85 |
| 6,278,254 B1 | 8/2001 | Harkey | |
| 6,918,307 B2 | 7/2005 | Ohlsson et al. | |
| 2002/0117986 A1 | 8/2002 | Becerra et al. | |
| 2005/0043922 A1 | 2/2005 | Weidl et al. | |
| 2005/0187738 A1* | 8/2005 | Zuzuly et al. | 702/183 |

FOREIGN PATENT DOCUMENTS

EP        1037373 A2      9/2000

* cited by examiner

*Primary Examiner*—Lincoln Donovan
*Assistant Examiner*—Erick Glass
(74) *Attorney, Agent, or Firm*—Venable LLP; Eric J. Franklin (57) ABSTRACT

An apparatus for monitoring and control of one or more electric motors, including a motor controller, equipped with a soft starter. The soft starter includes memory for storing operations and event data, as well as a human-machine interface for making the event information available for display and/or analysis. A method to monitor and diagnose a condition of an electric motor controlled by a motor controller equipped with a soft starter including a human-machine interface. A computer program for carrying out the method.

27 Claims, 7 Drawing Sheets

| Nr | Code | Param | Event | Time |
|---|---|---|---|---|
| 1 | 401 | 0 | Fault FB Timeout | 2003-02-26 15:43 13 |
| 2 | 201 | 0 | Fault Intern 2 | 2003-02-21 16:23:25 |
| 3 | 155 | 0 | Fault Phase Loss | 2003-02-14 14:51:21 |
| 4 | 155 | 0 | Fault Phase Loss | 2003-02-14 12:31:11 |
| 5 | 116 | 0 | Prot PTC | 2003-02-12 16:33:07 |
| 6 | 401 | 0 | Fault FB Timeout | 2003-02-10 11:13:39 |

Figure 6

Figure 7

DEVICE AND METHOD TO MONITOR AN APPARATUS

CROSS-REFERENCE TO RELATED APPLICATIONS

This application claims priority to U.S. provisional patent application No. 60/450,679 filed 3 Mar. 2003 and is the national phase under 35 U.S.C. §371 of PCT/SE2004/000291 filed 2 Mar. 2004.

TECHNICAL FIELD

The present invention is concerned with an apparatus and method for monitoring and control of electric motors. In particular it is concerned with a motor controller, comprising a soft starter, with means for monitoring one or more electric motors connected to it and thereby, to monitor a plant or process the motor is associated with.

BACKGROUND ART

There are many situations in industry in which it is necessary to measure a parameter in the production process or in the surrounding environment. Process control and other control applications in industry often relies on sensors to provide feedback about the operating condition of equipment and processes. Large and complex Process Control systems or Supervisory Control and Data Acquisition (SCADA) systems have been developed for the purpose of automating processes and equipment in industrial and commercial plants. Such systems are typically not fully standardised but are often purpose built and usually include many proprietary devices and/or sub-systems, software and communication protocols.

However a drawback to the well known approach of gathering data for control purposes from sensors is that the cost of different such sensors, their installation, calibration, maintenance and eventual replacement represents a considerable investment and on-going expense.

The drive means for much of the equipment of a certain size in industrial and commercial is electric motors. Many electric motors used in industrial and commercial processes and buildings are controlled by soft starter equipment. Soft starters are used to start a motor and stop a motor in a desired manner, primarily to eliminate electrical current surges in the electrical supply and/or overheating in the motor. Soft starters are also used to reduce or eliminate mechanical shocks or vibration which might otherwise occur under start/stop conditions causing wear and damage to the pumps, fans etc. driven by the motors. A soft starter typically measures the input current of the motor and regulates the input current/and or voltage received by the motor to achieve a desired start or stop performance.

Soft starters are well known in general industrial practice, see for example, EP 1 037 373 A2, entitled "Command module for motor control system".

SUMMARY OF THE INVENTION

The aim of the present invention is to remedy one or more of the above mentioned problems. This and other aims are obtained by the features as defined in the appended claims.

The major advantage of the invention is that monitoring of equipment may be carried out at least in part by means of that one or more electric motors in the plant or process equipment are equipped with a motor controller including a soft starter according to the present invention, which may be used to monitor the motor and thereby, to a considerable extent, the process that the motor forms a part of.

During operation of the one or more motors a number of logs are saved in the memory storage and in ram of the motor controller/soft starter. One such standard log is an event log of the last 21 events, which in this log means all error or alarm events. Another log contains data on Starts and stops so that the number of starts and all of the runtimes is known. Other operations data is also saved in different logs, including custom logs which may be configured by a user to meet the user's requirements regarding any of all the possible electrical and other parameters from current, voltage, frequency etc per phase the user wants to maintain a record of. All of this data, comprised in the standard logs and the configured logs, is made available according to the present invention, via a data interface of the soft starter to a computer, either by direct connection to the soft starter or via a data network that the soft starter is connected to. In this way, the operating data of the soft starter, and thereby the one or more electric motors is captured and made available for monitoring and analysis by an operator and/or even by a computerised process. In addition, access to the soft starter or specific functions of may be password protected.

Another advantage of the invention is that it may control a plurality of electric motors, up to three electric motors. This means that the control functions enabled by the motor controller are available for up to three processes or part-processes. Operational data such as number of starts, and of lists of standard events as well as lists of alarms, is thus available for a plurality of motor applications and thereby processes.

In another aspect of the invention a method is described for monitoring one or more motors using a motor controller with a soft starter according to the invention. The method includes use of the human-machine interface of the invention comprising information displayed by the visual display and use of the selection means to select a function and/or to navigate to other options. Local control functions may also be activated by a user who may be local, using a computer or data network connected to the soft starter, or using a remote computer connected to the soft starter or a data network the soft starter is connected to. Such data connections may also include wireless data connections.

In another aspect of the invention a computer program is described for carrying out the method according to the invention. In another aspect of the invention a computer program product comprising a computer program for carrying out the method of the invention is described. In another aspect of the invention a computer data signal embodied in a carrier wave is described. In another, further aspect of the invention a graphical user interface is described for displaying control and/or operational and/or maintenance data for the one or more of the electric motors so controlled.

BRIEF DESCRIPTION OF THE DRAWINGS

A more complete understanding of the method and system of the present invention may be had by reference to the following detailed description when taken in conjunction with the accompanying drawings wherein.

DESCRIPTION OF THE PREFERRED EMBODIMENTS

Figure 1:
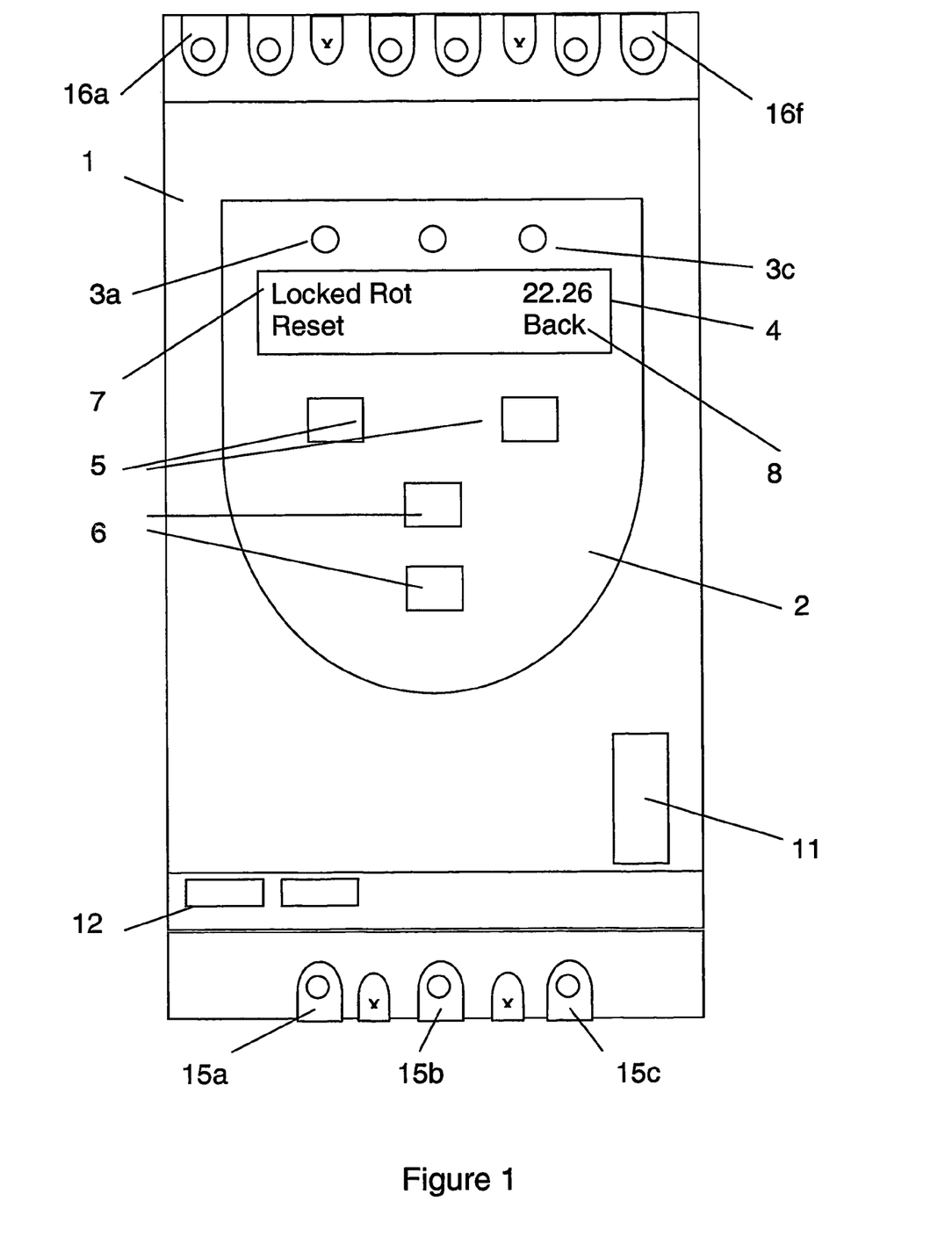
FIG. 1 shows a front view of the soft starter according to an embodiment of the invention.

FIG. 1 shows a front elevation of the motor controller 1 comprising a soft starter according to the present invention. A control panel 2 is located on the front of the soft starter 1. The control panel 2 comprises a display 4 and selection buttons 5 and navigation buttons 6. Three indicator lights are indicated, a Power On indicator 3a, green when lit, a Fault indicator 3b, red, and a Protection indicator, yellow when lit. The features of display 4 and buttons 5, 6 comprise the essential elements of the HMI for configuring and operating the soft starter.

Also indicated in FIG. 1 are two data interfaces 12 and an aperture in the front panel of the soft starter for a field bus connection 11. The position of power supplied to the soft starter, Power line in, is indicated by the three terminals 15 a, b, c at the bottom of the soft starter. The position of 6 power lines for connection out to one or more electric motors is shown at the top of the starter, 16a-16f, where only 16a and 16f are indicated by reference on the drawing for the sake of clarity. The outputs 16b, 16d, and 16f are provided for connection to an external bypass contactor (not shown in FIG. 1). The soft starter is a semiconductor based AC motor controller and motor starter according to IEC:1999+A1: 2001 and UL Standard UL 508. In use the semiconductor based thyristors get very warm and so it is common practice to bypass the soft starter, when it is not in active use for starting or stopping. The use of such a bypass avoids developing too much heat, especially if the device is somewhat enclosed in cabinets etc, as well as saving energy. This method of protecting the device against excess temperatures is in addition to the current Overload Protection included in the motor controller.

Figure 2:
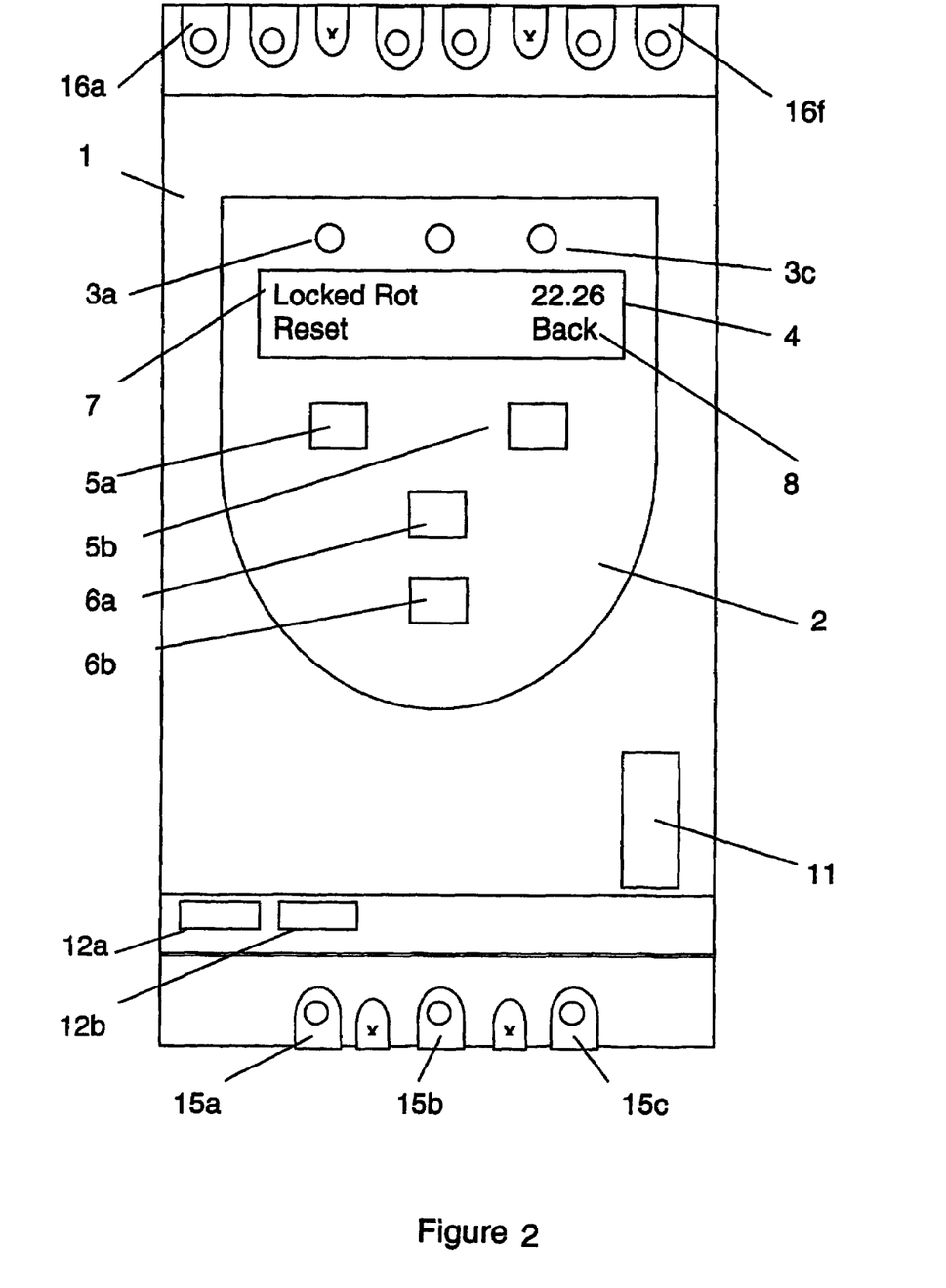
FIG. 2 shows a front view of the soft starter according to an embodiment of the invention.

A preferred embodiment of the soft starter is shown in FIG. 2. In FIG. 2, a selection button 5a is shown, together with a selection and/or back button 5b. A navigation and/or up button 6a is shown together with a navigation and/or down button 6b.

Figure 4:
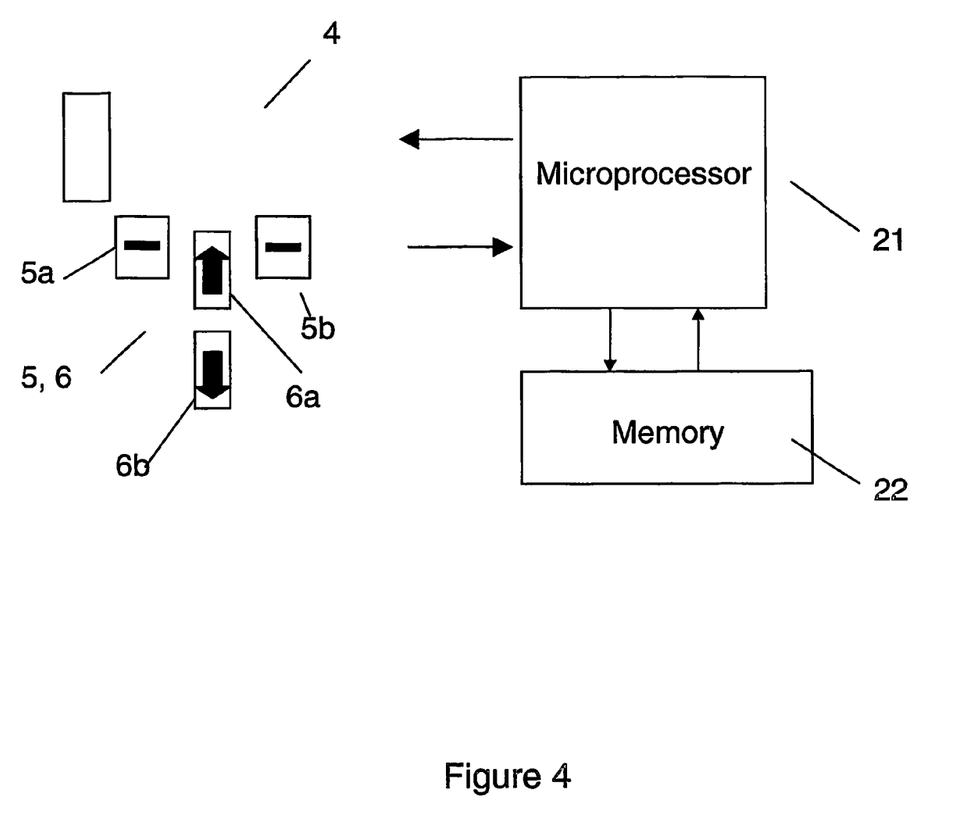
FIG. 4 shows a schematic diagram for connection of the motor controller to a field bus network.

FIG. 4 shows elements of a system in a simplified block diagram. A display 4 associated with selection means 5, 6 which may, for example, be buttons corresponding to 5a, 5b, 6a, 6b. A microprocessor 21 is shown and a memory means 22. Selections made by the selection means 5, 6 embodied as button 5a, b, 6a, b or in other forms are registered with the microprocessor and stored if relevant in working memory and/or in long term storage memory. The functions displayed at the time of selections being made are also displayed by means of the microprocessor, so that the selection options available are provided on display means 4 by program means run by the microprocessor 21 and the selection options actually made are saved in the memory means 22. The display is preferably a LCD (Liquid Crystal Display) but may be any other means including touch sensitive screen materials.

Figure 3:
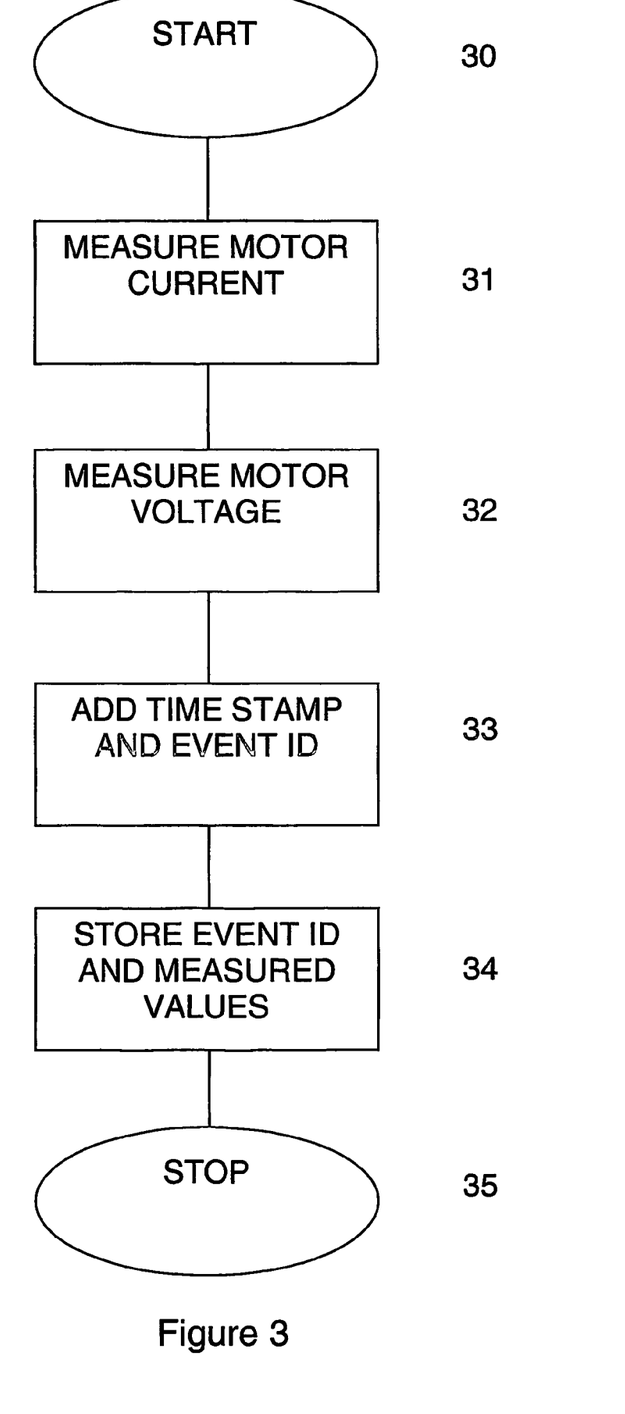
FIG. 3 shows a flowchart for a method for measuring and storing values according to an embodiment of the invention.

FIG. 3 shows an exemplary method by which operational data may be measured and saved according to the invention. As part of the functions of the motor controller and its soft starter, measurements for parameters such as currents, voltages, phases, temperatures and so on are made substantially continuously. FIG. 3 shows a method or loop that begins at 30 and measures the current to a motor at 31, and the voltage at 32. A time stamp and an identifier for what kind of measurement or event is being recorded is made at 33. The measurements are stored together with the time stamp and event ID at 34. The loop ends at 35. Measurements may be made for every soft start and/or soft stop.

Data, both operations data and configuration data, may be comprised in the standard logs and the configured logs in a motor controller with a soft starter according to the present invention. A part of a standard event log containing for example the last 21 events is shown in FIG. 6.

Figure 6:
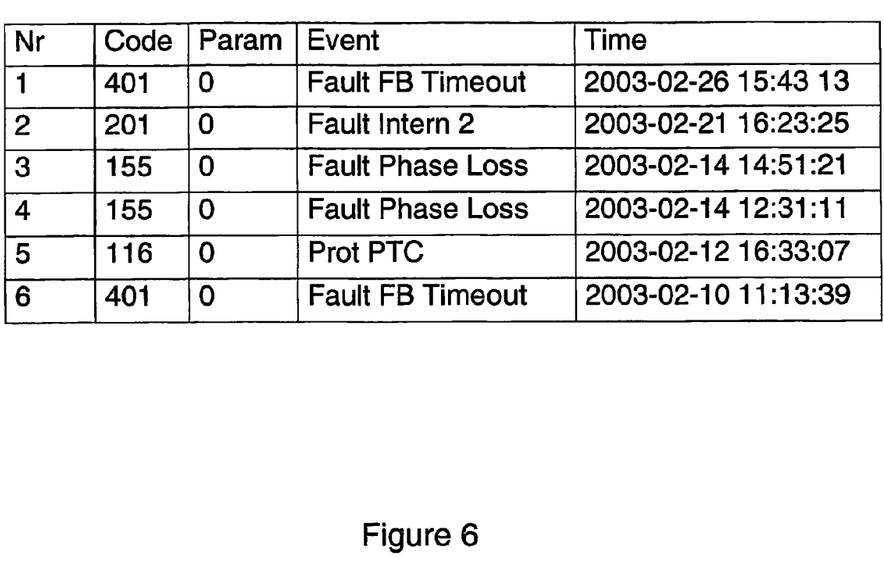
FIG. 6 shows part of a standard event log provided according to an embodiment of the invention.
Figure 7:
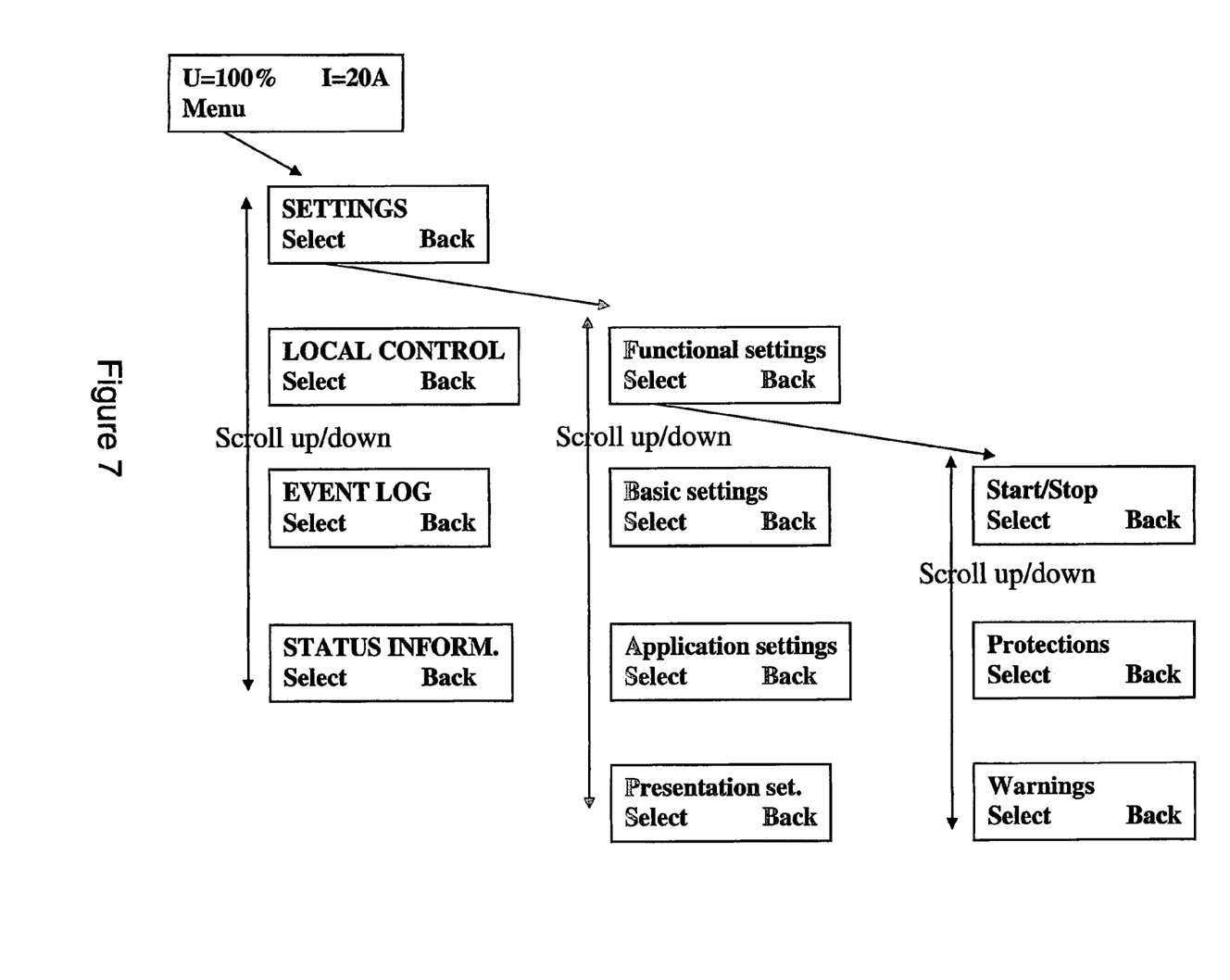
FIG. 7 shows schematically function and navigation options of the HMI of the motor controller according to an embodiment of the invention.

FIG. 7 shows another representation of the functions and navigation options of the HMI of the motor controller shown in FIG. 6. From FIG. 7 the effect of making selections with the selection means 5, 6 such as an up 6a, down 6b or left 5a, right 5b may be seen. Thus a sequence from the start menu of pressing Down to Settings functions, pressing Down to Select, pressing Left to activate Select, so accessing Functional Settings; then pressing Down to select functional settings; so accessing either Start/stop, Protections or Warnings. It can be seen that selections are made or activated by activating (pressing real buttons or selecting representations of buttons on a display or computer screen) the selection means (button) such as Down that corresponds to the position on the display, out of lower or upper, that is required. Similarly selections of the left, right buttons are chosen when the required selection is on the left or right of the display.

All of this data, comprised in the standard logs and any user-configured logs, is made available according to the present invention, at the HMI interface on the motor controller and/or via a data interface of the soft starter to a computer, either by direct connection to the soft starter or via a data network that the soft starter is connected to. In this way, the relevant operating data of the soft starter is captured and made available for monitoring and analysis by an operator or even by a computerised process. Access by a user to the controller and to any functions or operation data values displayed may be arranged to be displayed and/or accessed dependent on a user supplying and/or inputting a valid password.

Display of the operations and configuration data of one or more of the electric motors controlled by the soft starter may be displayed and examined using the HMI of the soft starter. However the same data input method and display schemes may also be carried out using a computer or similar connected to the soft starter. FIG. 1 shows two data ports 12. In FIG. 2, data port 12a may represent a standard serial data port and data port 12b another type of data port. The soft starter comprises circuit means, connection means and software means such that the procedures available via the HMI are equally available via a computer connected via data port 12a or 12b. This means in practice that instead of physically pressing buttons 5a,b, 6a, b on the front of the soft starter, the user input is carried out by means of mouse clicks on images of buttons or other selection devices displayed on a suitable computer screen.

Figure 5:
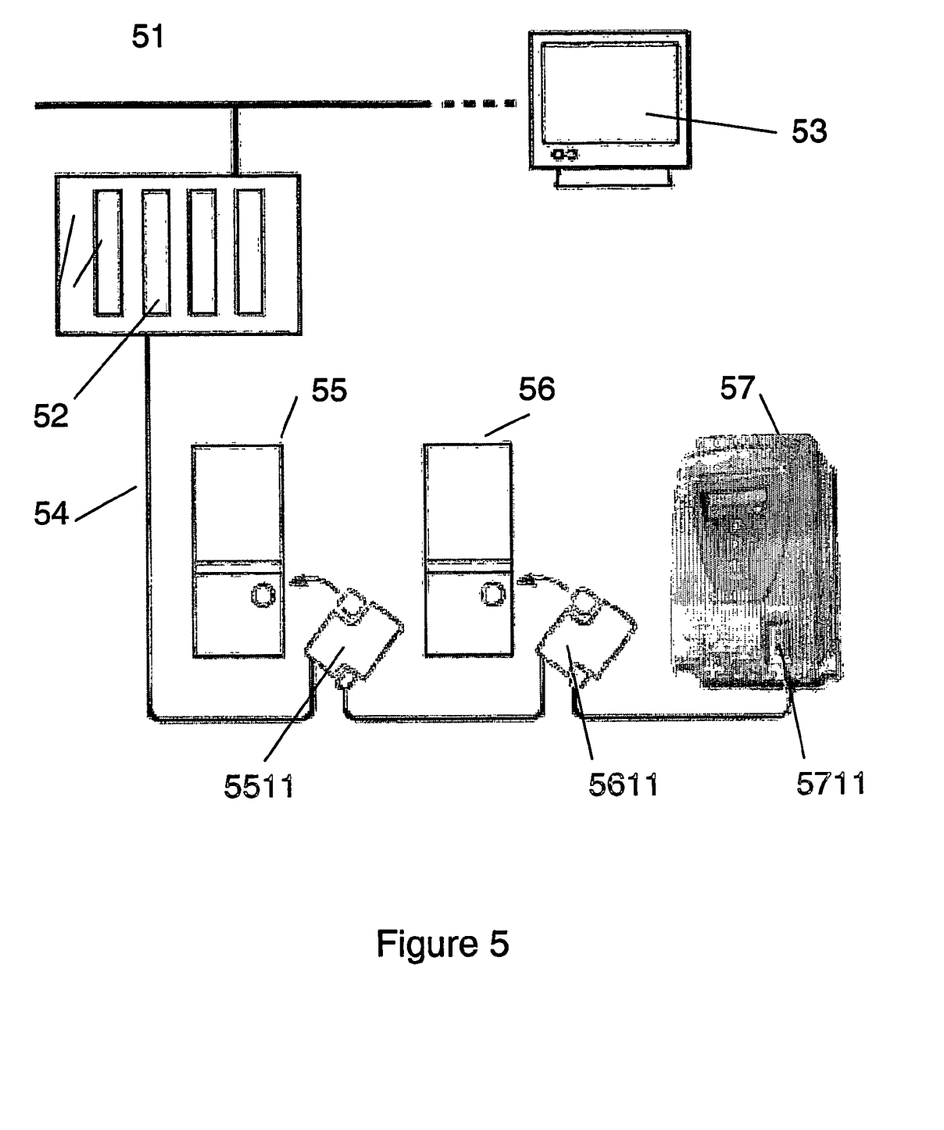
FIG. 5 shows a block diagram of components and systems that are comprised in the soft starter of the motor controller.

FIG. 5 shows in a schematic way how one or more motor controllers may be connected via a field bus network to a control system. FIG. 5 shows a data network 51 of a control system and a computer or workstation 53 connected to the control system. The control system comprises a bank of controllers 52, and a field bus 54 to which three of the soft starter motor controllers according to the invention are connected for digital exchange of data between the motor controllers and the control system. The connection is made by field bus plugs 5511, 5611, 5711 into the field bus socket of the soft starter (see 11 in FIGS. 1, 2). The field bus may be compatible with a known standard such as any of MODBUS, Profibus, DeviceNet, AS-1, Fieldbus Foundation, Ethernet.

Similarly to the data ports 12, the soft starter comprises a field bus connection 11 which allows all the data collected by the soft starter to be available for interrogation and communication via a field bus. Thus by means of either a direct serial data connection, or by means of a computer connected to a network that is connected to the field bus network, a soft starter may be configured using a computer nearby or remotely. It is also the case that the soft starter may be configured over any data network including over the Internet by means of one of those two data connections 11, 12.

Configuration may also be carried out using wireless means such as a IR or Bluetooth equipped computer, mobile phone or PDA or other mobile computing device. A wireless node (not shown) may be connected to a data port 12 or to the field bus network that the soft starter is connected to via field bus connector 11. By means of the wireless node connected in some way to the soft starter the soft starter may be configured wirelessly using the same methods as herein described. Any wireless protocol capable of providing reliable transmissions in an industrial environment may be used, including standards or protocols such as Bluetooth, Wireless LAN (WLAN). For the communication there may be further requirements imposed by the field busses or other parts of the control system. In a preferred embodiment of the invention the communication technology used is based on the Bluetooth system. The fact that the range of a Bluetooth device is limited to around 10 m may be advantageous in environments with many radio devices or areas where it is very important to keep the radio interference levels as low as possible.

Thus one or more processes including any of the one or more electric motors that may be controlled by a motor controller with a soft starter and an HMI according to the invention may be monitored. Thus monitoring of many processes may be carried out without the use of extra sensors to measure for example rotations speeds, flow rates, pressures, fluid levels, torques and other suitable factors, that may be derived from data of current and voltage of the electric motor, for example according to the methods disclosed in the unpublished international publication no. PCT/SE02/01844 hereby incorporated in full by means of this reference. In addition, maintenance plans may be created and maintenance actions taken as a result of collecting data such as number of starts, as well as overload and protection events.

In the best use of the present invention it is used in combination with a control system applied by ABB incorporating the Industrial IT methods and systems. In that control system there are trigger agents being a kind of software program that searches the control system and collect maintenance data from specified devices. When a pre-determined number of maintenance events have been observed the agent triggers the production of a maintenance schedule or order. For each device, representing in a system by a software object, system maintenance information is thus available. This information can be used to identify what equipment is used and to what extent a particular equipment object have been used over a time period. This can then be compared with a configured limit to decide whether to repair or replace the equipment.

The communications from the soft starter via a data network also comprise a computer data signal in another aspect of the invention. The computer data signal is for monitoring and/or control and/or configuration of a motor controller (1) arranged to provide control and soft starting to one or more electric motors embodied in a carrier wave. The data signal complies with one of more formats, for example internally formatted as an XML file, and includes means to identify the sending soft starter and the type of data such as number of starts, saved events, saved alarms, configured overload protection etc. etc. for said motor controller.

The data obtained from the motor controller may be analysed by any suitable statistical or modelling or simulation method. In one embodiment, it is best analysed using a Baysian network analysis, such as or similar to one such as described in the international application PCT/EP02/12824 filed 2002-11-15 entitled Analyzing events, which deals with Baysian networks for root cause analysis of maintenance and other data.

The microprocessor (21)(or processors) of the soft starter, or of a motor controller including the soft starter, comprises at least one central processing unit CPU performing the steps of the method according to an aspect of the invention. This is performed with the aid of one or more computer programs, which are stored at least in part in memory accessible by the processor. It is to be understood that the computer programs may also be run on one or more general purpose industrial microprocessors or computers instead of a specially adapted computer.

The computer program comprises computer program code elements or software code portions that make the computer perform the method using equations, algorithms, data and calculations previously described. A part of the program may be stored in a processor as above, but also in a ROM, RAM, PROM, EPROM or EEPROM chip or similar memory means. The program in part or in whole may also be stored on, or in, other suitable computer readable medium such as a magnetic disk, CD-ROM or DVD disk, hard disk, magneto-optical memory storage means, in volatile memory, in flash memory, as firmware, or stored on a data server. Removable memory media such as removable hard drives, bubble memory devices, flash memory devices and commercially available proprietary removable media such as the Sony memory stick and memory cards for digital cameras, video cameras and the like may also be used.

The computer programs described may also be arranged in part as a distributed application capable of running on several different computers or computer systems at more or less the same time.

In another embodiment of the motor controller comprising the soft starter, a bypass contactor is built in to the same motor controller apparatus 1, thus making connections to an external bypass contactor unnecessary. In addition, configuration tasks are simplified by having the bypass already built in to the soft starter.

In a yet further embodiment of the invention, the HMI of the motor controller may be embodied as a touch screen. In this case, text lines or images included in the display 4 of the preferred embodiment, and the select, navigation buttons 5a,

*b* and 6*a, b*, may each be embodied as images on a touch screen. Monitoring of the operations of one or more of the electric motors controlled by the motor controller may be carried out according to the same method but executed by means of touching parts of the screen instead of pressing buttons, or by clicking with a computer mouse or other pointing/selection device.

The invention claimed is:

1. An apparatus for monitoring and control of one or more electric motors, comprising:
   a motor controller configured to provide control and soft start and/or soft stop functions to one or more AC electric motors running on one or more phases, the motor controller comprising a soft starter, wherein said soft starter comprises memory for storing configuration, operations and event data, the data comprising start data, stop data, runtime data, error event data, alarm event data, and time stamps and identifiers, and a human-machine interface for making the event data available for display and/or analysis, wherein the human-machine interface comprises a visual display configured to visually present one or more of the configuration, operations and event data, and selection means for selecting the one or more functions so displayed and/or navigating to another function or menu option according to the relative position on the visual display of the functions and/or menu options so displayed.

2. The apparatus according to claim 1, wherein the selection means comprise means for selecting either from an option in a position on the left of two horizontal positions of the display or a position on the right in the display.

3. The apparatus according to claim 2, wherein the selection means comprise means for selecting either from an option in a position in the upper part of two vertical positions in the display or a position in the lower part of two positions in a display.

4. The apparatus according to claim 1, wherein the memory means comprises working memory and long term protected storage memory.

5. The apparatus according to claim 4, wherein the working memory of the memory means is a Random Access Memory.

6. The apparatus according to claim 4, wherein the memory means is a protected area of a random access memory.

7. The apparatus according to claim 4, wherein the memory means includes a removable memory means.

8. The apparatus according to claim 1, further comprising a serial data interface.

9. The apparatus according to claim 1, further comprising a field bus connection.

10. The apparatus according to claim 9, wherein the apparatus is connected to a field bus.

11. The apparatus according to claim 1, wherein said motor controller may provide control and soft start functions to an AC electric motor running at either of two selectable frequencies.

12. The apparatus according to claim 1, wherein said motor controller comprises connections for an external bypass contactor.

13. The apparatus according to claim 1, wherein said motor controller comprises a built-in bypass contactor.

14. A method to monitor and diagnose a condition of an electric motor controlled by a motor controller equipped with a soft starter including a human-machine interface, the method comprising:
   obtaining information about starting and/or stopping events in said soft starter, the information comprising start data, stop data, runtime data, error event data, alarm event data, and time stamps and identifiers,
   storing the information about the events in a memory means of said soft starter, and
   retrieving stored event information and making it available for display and/or analysis with a human-machine interface, wherein the human-machine interface comprises a visual display configured to visually present one or more of the configuration, operation and event data, and selection means for selecting the one or more functions so displayed and/or navigating to another function or menu option according to the relative position on the visual display of the functions and/or menu options so displayed.

15. The method according to claim 14, further comprising analyzing operations and/or event data by means of a Bayesian network analysis.

16. The apparatus according to claim 1, wherein the apparatus is operative to monitor and/or operate an electric motor used to drive any application from the list of: Centrifugal Pump, Hydraulic Pump, Centrifugal Fan, Axial Fan, Compressor, Conveyor, Crusher, Mixer, Bow Thruster.

17. The apparatus according to claim 1, wherein the apparatus is operative to permit a human operator to supervise a function of a device arranged driven by at least one electric motor controlled by the motor controller.

18. The apparatus according to claim 1, further comprising: at least one computer operative to run a process to monitor a function of a device arranged driven by at least one electric motor controlled by the motor controller.

19. A computer program product, comprising:
   a computer readable medium; and
   computer code means and/or software code portions recorded on the computer readable medium for making a computer or processor perform a method comprising obtaining information about starting and/or stopping events in a soft starter, the information comprising start data, stop data, runtime data, error event data, alarm event data, and time stamps and identifiers; storing the information about the events in a memory means of said soft starter; and retrieving stored event information and making it available for display and/or analysis with a human-machine interface, wherein the human-machine interface comprises a visual display configured to visually present one or more of the configuration, operation and event data, and selection means for selecting the one or more functions so displayed and/or navigating to another function or menu option according to the relative position on the visual display of the functions and/or menu options so displayed.

20. A graphical user interface for displaying configuration functions and data for a motor controller configured to provide control and soft start and/or soft stop functions to an AC electric motor running on one or more phases of one or more an electric motors, the motor controller comprising a soft starter, wherein said soft starter comprises memory for storing configureation, operations and event data, the data comprising start data, stop data, runtime data, error event data, alarm event data, and time stamps and identifiers, the human-machine interface makes the event data available for display and/or analysis, wherein the human-machine interface comprises a visual display configured to visually present one or more of the configuration, operation and event data, and selection means for selecting the one or more functions so displayed and/or navigating to another function or menu option according to the relative position on the visual display of the functions and/or menu options so displayed.

21. The graphical user interface according to claim 20, further comprising a representation of the visual display of the motor controller and the selection means of the controller in a graphical user interface on a computer display screen of a computing device.

22. The graphical user interface according to claim 21, wherein the computing device may be a portable computing device comprising any from the list of: infrared or Bluetooth, mobile phone or personal digital assistant.

23. A graphical user interface according to claim 21, wherein the operation data values displayed are arranged to be displayed upon activation of a part of the graphical representation of the motor controller using a computer mouse, touch screen, or stylus.

24. The graphical user interface according to claim 20, wherein the operation data values displayed are arranged to be displayed and/or accessed dependent on a user supplying and/or inputting a valid password.

25. The apparatus according to claim 10, wherein the field bus is compatible with a bus standard selected from the list of: MODBUS, Profibus, DeviceNet, AS-1, Fieldbus Foundation, Ethernet.

26. A soft starter configured to provide soft starting and stopping of at least one motor in order to eliminate electrical current surges in the electrical supply to the motor and to avoid overheating of the motor during starting and stopping of the motor, wherein the soft starter is adapted to continuously perform measurements of operational data for the motor and to regulate the input current to the motor based on said measurements to achieve a desired start and stop performance, the soft starter comprising:
- a memory for storing the measured operational data including current and voltage of the motor and event data including starting and stopping events and time stamps of the starting and stopping events; and
- an interface for making said stored data available for analysis.

27. A method to monitor and diagnose a condition of an electric motor controlled by a softstarter configured to provide soft starting and stopping of the motor in order to eliminate electrical current surges in the electrical supply to the motor and to avoid overheating of the motor during starting and stopping of the motor, the method comprising:
- continuously performing with the soft starter measurements operational data for the motor, including current and voltage;
- storing event data, including starting and stopping events, and the measured operational data together with time stamps of the event data and measured operational data in a memory of the softstarter;
- retrieving said stored data and making it available for analysis; and
- regulating an input current to the motor based on said measurements to achieve a desired start and stop performance.

* * * * *